United States Patent Office 3,592,660
Patented July 13, 1971

3,592,660
METHOD AND COMPOSITION FOR
CONDITIONING BREAD DOUGH
Gerald D. Neu, Kingsport, Tenn., assignor to Eastman
Kodak Company, Rochester, N.Y.
No Drawing. Continuation-in-part of application Ser. No.
719,253, Apr. 5, 1968. This application May 6, 1970,
Ser. No. 35,229
Int. Cl. A21d *2/14, 2/16*
U.S. Cl. 99—91   9 Claims

ABSTRACT OF THE DISCLOSURE

A hydrate of a calcium salt of at least one $C_{14}$-$C_{20}$ fatty acid, a monoglyceride and water is incorporated in bread dough for its dough conditioning effect. An amount providing calcium salt between 0.1 and 10 ounces per 100 pounds of flour is effective, but best results are secured with between 0.5 and 8 ounces per 100 pounds of flour. The hydrate can be added either to the sponge or the dough in a sponge-dough process. In a continuous process the hydrate can be added to the brew.

This application is a continuation-in-part of my application Ser. No. 719,253 filed Apr. 5, 1968, now abandoned.

BACKGROUND OF THE INVENTION

Field of the invention

The present invention relates to a novel method for conditioning bread dough prior to baking, and for also producing a finished baked bread having superior softness and antistaling characteristics. The invention also contemplates a novel hydrate composition having both a dough conditioning effect and a bread softening effect.

Description of the prior art

"Hard" flour has a high protein and gluten content, and dough conditioners are usually required to help to mellow the gluten or act on the flour in some way to permit proper development of the dough without excessive mixing.

"Soft" flour is one having lower protein and gluten content, or having a type of gluten which is more easily developed, and generally requires less mixing. Such "soft" flour will not absorb as much water as "hard" flour without becoming sticky. Dough conditioners are required when preparing bread from such a "soft" flour to help permit uniform water absorption and condition the dough so that it is dry and non-sticky and thereby readily machinable.

Dough conditioners have enabled bakeries to obviate some of the variables due to the natural states of the various flours used for making bread, thus permitting more uniform water absorption and better machine tolerance for the fermented doughs.

The term "dough conditioner" is applied to a product which, when added to bread dough, increases elasticity, mellowness, machine tolerance and water absorption of the dough.

Among the additives that have been proposed is calcium stearate powder which is described in British Patent 576,055 as useful either alone or with other unnamed bread improvers in powder form.

Calcium stearate powder will disperse readily in the sponge or the dough phase during the manufacture of bread by the well known sponge-dough process, but is less active than desired, requiring substantial amounts to provide a desired dough conditioning effect.

Another disadvantage of calcium stearate powder will appear if used in the well known continuous process for bread manufacture wherein an essential part of the process involves the use of a predominantly aqueous brew which is fed into combination with other bread ingredients such as flour and shortening. Calcium stearate powder is hydrophobic, and when it is added to the brew it floats to the top, and can only be dispersed by most intense beating and stirring. Even when the calcium stearate powder is mixed with a powdered emulsifier such as one of the well known Myverol type monoglycerides, the calcium stearate will separate out and float to the top.

SUMMARY OF THE INVENTION

In accordance with the present invention, I have discovered that the calcium salt or salts of at least one fatty acid having from 14 to 20 carbon atoms, when combined in a hydrate with a monoglyceride, provides excellent dough conditioning effects when incorporated into the bread baking mix as a dough conditioner prior to baking. Additionally, bread baked from dough containing such a hydrate has excellent qualities of softness and resistance to staling. At the same time, such a hydrate provides a surprisingly improved cell structure in the finished bread by creating finer and more uniform cells than are obtained without it. Moreover, the bread baked with this novel hydrate has side walls which are considerably strengthened, compared with bread not containing the dough conditioner; and the finished bread loaf has greater volume than the bread not containing calcium stearate.

Another important advantage is that the hydrate has superior activity because the monoglyceride acts as a synergist so that less calcium stearate is required for an equivalent dough conditioning effect than when used alone. Furthermore, the hydrate is easily mixed into either the dough or the sponge in the sponge-dough process, and into the brew in the continuous process, thus being adaptable to both types of processes.

While any amount of such calcium salts up to 10 ounces per 100 pounds of flour (e.g., 0.1 to 10 counces) is effective for conditioning bread dough, the best results are obtained when added in an amount between 0.5 and 8 ounces per 100 pounds of flour (0.03%–0.5% of the flour by weight).

The desired improvements can be secured with a hydrate containing 5–35% monoglyceride, 5–50% of such calcium salt, and 30–90% of water, by weight; preferred ranges being 10–20% monoglyceride, 6–40% calcium salt, balance water.

Such a hydrate containing the calcium salt and monoglyceride imparts dough conditioning to fermented doughs when added either to the sponge stage or the dough stage of the conventional sponge-dough bread baking operation. In the continuous mix process it can be added to the brew tank, to the incorporator, or to the slurry tank. Thus it has universal utility in bread manufacture.

It is particularly advantageous for the calcium salt to be combined with an emulsifier composition in the form of hydrated distilled monoglycerides (e.g. glycerol monostearate), but the term "monoglycerides" as used herein is also intended to include the commercially available products known as monodiglycerides which have not been distilled and thus contain some diglycerides along with the more active monoglycerides. Suitable monoglycerides are saturated fatty acid monoesters of glycerol wherein the fatty acid moiety comprises 8–22C, and usually 14–20C.

The fatty acid moieties can be from fully hydrogenated lard, tallow, cottonseed oil, soybean oil, peanut oil, sesame oil and the like. For example see U.S. Pats. 2,701,769 and 3,388,999. Such a hydrated combination provides improved dough conditioning, produces an even softer bread than is obtainable with the emulsifier composition alone, and is readily dispersible during the dough preparation process, before baking.

In preparing the hydrate the desired proportions of calcium salt, monoglyceride and water are beaten vigorously at a temperature of about 155° F. until an intimate dispersion forms. The dispersion is then cooled to room temperature, while beating is continued, at which point it becomes a smooth uniform plastic product.

DESCRIPTION OF THE PREFERRED EMBODIMENTS

The principles of the invention will be described more in detail below in examples showing how calcium salts of $C_{14}$-$C_{20}$ fatty acids in a hydrate with a monoglyceride can be used successfully in producing bread. A commercial bread formula is used in the following Examples I-V, except that the water absorption is increased to 69% (instead of the measured water absorption of 67.5%) to provide a more critical test of dough conditioning.

BREAD FORMULA (SPONGE-DOUGH PROCESS)

Sponge: Percent of flour
Flour _____ 65.0
Water _____ 40.5
Yeast _____ 2.0
Yeast food _____ 0.5

Mix time: 4.5 minutes.
Ferment time: 4.5 hours at 87° F. and 80% humidity.
Dough (includes the fermented sponge):
Flour _____ 35.0
Water _____ 28.5
Sugar _____ 6.0
Salt _____ 2.25
Milk powder _____ 4.0
Shortening _____ 3.0
Dough conditioner, test level.

Mix time: 9.5 minutes.
Floor time: 30 minutes.
Proof time: 1 hour at 98° F. and 95% humidity.
Bake time: 20 minutes at 450° F.

Laboratory equipment consists of a Hobart mixer, proofing cabinet, and rotating hearth oven. Bread is wrapped and stored in a constant temperature and humidity room. Bread is sliced and tested for softness.

BREAD SOFTNESS TESTS

Bread softness data are obtained with a Baker Compressimeter. Five spaced slices are selected, and the amount of stress in grams required to exert a strain (or compression) of 3 mm. in a 1 cm. slice is determined.

A test dough is baked using the above formula and added hydrate of calcium salt and monoglyceride as the dough conditioner. Another is baked using the same formula, but with no added hydrate; this is known as the control. The breads are tested for softness over a period of six days. A "Softness Number" of 100 is assumed to be a Baker Compressimeter figure of 4 for each day beginning with the second day and including the sixth day.

The "Softness Number" reported is the arithmetical average of the "Daily Softness Numbers" calculated for each example at the end of each storage period including 2, 3, 4, 5 and 6 days. The data at the end of the first day's storage are not used, since they often show excessive random variation.

At the end of each storage period, the softness number is calculated from the Compressimeter readings as follows:

$$\text{Softness number} = \frac{(C_c - C_t) \times 100}{(C_c - 4.0)}$$

where:

$C_c$=Compressimeter reading (grams), for control bread.
$C_t$=Compressimeter reading (grams), for test bread.

The benefits of the invention are obtainable with a hydrate containing an essentially pure calcium salt of any single $C_{14}$-$C_{20}$ unsubstituted fatty acid, but for practical purposes it is advantageous to use a commercially available mixture of such salts. One such mixture (identified as "calcium salt" in the examples) is sold by Witco Chemical Company as food grade calcium stearate, and has been found to have the following saturated fatty acid moiety content by weight:

| | Percent |
|---|---|
| Myristic ($C_{14}$) | 0.9 |
| Palmitic ($C_{16}$) | 27.0 |
| Margaric ($C_{17}$) | 0.8 |
| Stearic ($C_{18}$) | 70.4 |
| Arachidic ($C_{20}$) | 0.9 |

Similar mixtures are useful wherein the stearic acid moiety is at least 45% and less than 100%, with the major proportion of the balance being the palmitic acid moiety. For instance, a composition whereinthe stearic acid moiety is at least 45%, and the palmitic acid moiety is between 10 and 50% is effective.

Example I (control).—A control batch of bread is baked using a "hard" flour. The dough requires 8 minutes for development of the gluten. After mixing, the dough is soft and sticky.

This dough proofs in 55 minutes, and after baking Baker Compressimeter readings are 7.8, 11.6, 12.0 and 15.0. The bread scores 91 by the American Institute of Baking (A.I.B.) scoring procedure, which is based on color of crust, symmetry of form, evenness of bake, character of crust, break and shred, grain, color of crumb, aroma, taste, texture, and mastication. The approximate average score of commercially acceptable sponge-dough bread is 88 to 90. The control bread is assigned a softness number of zero.

Example II.—Another batch of bread is made in accordance with Example I except that 8 ounces per 100 pounds of flour (0.5% of the flour by weight) are added of an aqueous dispersion containing 18.5 parts of Myverol distilled monoglycerides (Type 18-00—distilled from the reaction product of glycerine and fully hydrogenated lard), 6.5 parts of calcium salt, and 75 parts water. This provides 0.52 ounce of calcium salt per 100 pounds of flour (0.03%). The dough is dry, mellow and elastic, and requires 8 minutes mixing for development of the gluten, as in Example I. Baker Compressimeter readings are 4.2, 4.6, 6.0 and 8.8 (second through fifth days). An average softness number of 74 is calculated in comparison with the control. The bread scores 93 by the A.I.B. method, which is above average.

Example III.—Another batch of bread is made in accordance with Example I except that to the sponge are added 8 ounces per 100 pounds of flour, of an aqueous dispersion containing 10% of Myverol distilled monoglycerides (Type 18-00), 40% of calcium salt, and 50% of water, all by weight. This provides 3.2 ounces of calcium salt and 0.8 ounce of monoglyceride per 100 pounds of flour.

The dough is well conditioned, being very elastic and mellow, and only very slightly sticky.

Baker Compressimeter readings for the finished bread are 7.8, 8.4, 9.4 and 11.2 (second through fifth days). An average softness number is calculated as 41, and the A.I.B. score is 93.

The synergistic nature of the ingredients of the hydrate of Example III becomes apparent from other tests run on a similar basis, but using calcium salt alone, or hydrated monoglyceride alone as the additive.

Example IV.—Four ounces of calcium salt alone per 100 pounds of flour, when added to the sponge or the dough, produces a dough that is non-sticky but is slightly bucky, meaning that in the molding process the dough tends to resist required mechanical deformation instead of conforming readily to the shape desired.

The 4 ounces of calcium salt alone thus is less effective than the 3.2 ounces in the hydrate of Example III.

It is not until 6 ounces of calcium salt alone are used that fully satisfactory dough conditioning is obtained (almost twice Example III).

Example V.—Six ounces of hydrated distilled monoglyceride (containing 1.5 ounces of monoglyceride) per 100 lbs. of flour, when added to the dough, produces a slightly sticky dough which is not conditioned at all.

Example VI (continuous mix process).—A brew (liquid sponge) is made up of the following ingredients and allowed to ferment:

| Ingredient: | Weight |
|---|---|
| Water | 270 |
| Yeast | 15.4 |
| Cerelose | 45.8 |
| Salt | 11.7 |
| Flour | 50.8 |
| Miscellaneous | 13.5 |

Fifteen minutes before pumping the brew to the holding tank, it is spiked with:

| | |
|---|---|
| Sugar | 10.3 |
| Water | 56.8 |
| Yeast | 1.9 |
| Calcium propionate | 0.5 |
| Test additive | As required |

At the mixer the spiked brew is combined with additional flour, shortening and other miscellaneous ingredients to form dough continuously, which is then panned to the required height, proofed and baked.

When powdered calcium stearate alone is the test additive, it does not disperse in the brew but remains in the foam at the top of the make-up tank. As the brew is pumped to the holding tank, a foam remains in the bottom of the make-up tank supporting dry, powdered calcium stearate.

In contrast, when the test additive is the hydrate of the present invention, it is readily dispersed in an agitated brew tank and is fully effective for conditioning the final dough.

The invention has been described in detail with particular reference to the preferred embodiments thereof, but it will be understood that variations and modifications can be effected within the spirit and scope of the invention.

I claim:

1. A method for preparing bread which comprises incorporating into the baking mix prior to baking a dough conditioning amount of a hydrous composition consisting essentially of 5–50% by weight of said composition of at least one calcium salt of at least one fatty acid having from 14–20 carbon atoms, 5–35% by weight of said composition of at least one monoglyceride, and 30–90% by weight of said composition water, the amount of said hydrous composition added being sufficient to provide from about 0.1 to 10 ounces of said calcium salt per 100 pounds of flour.

2. A method according to claim 1 whrein said hydrous composition is added at a level sufficient to provide from about 0.5 ounce to 4 ounces of said calcium salt per 100 pounds of flour.

3. A method according to claim 2 wherein said hydrous composition consists essentially of from about 6–40% by weight of said composition calcium salt, from about 10–20% by weight of said composition monoglyceride, and the balance water.

4. A method according to claim 3 wherein said calcium salt is a mixture of fatty acids wherein the fatty acid moieties comprise at least 45% stearic acid and no more than 55% palmitic acid by weight.

5. A method according to claim 3 wherein said calcium salt is a mixture of fatty acids wherein the fatty acid moieties comprise about 70% stearic acid and about 25% palmitic acid by weight.

6. A smooth uniform plastic hydrous composition having utility for dough conditioning in the manufacture of bread, said hydrous composition consisting essentially of 5–50% by weight of said composition of at least one calcium salt of at least one fatty acid having from 14–20 carbon atoms, 5–35% by weight of said composition of at least monoglyceride, and 30–90% by weight of said composition water.

7. A hydrous composition in accordance with claim 6 wherein said calcium salt is of a mixture of fatty acid wherein the fatty acid moieties comprise at least 45% stearic acid and no more than 55% palmitic by weight.

8. A hydrous composition according to claim 6 wherein said hydrous composition consists essentially of from about 6–40% by weight of said composition calcium salt, from 10–20% by weight of said composition monoglyceride, and the balance water.

9. A hydrous composition according to claim 8 wherein said calcium salt is of a mixture of fatty acids wherein the fatty acid moieties comprise about 70% stearic acid and about 25% palmitic acid by weight.

References Cited

FOREIGN PATENTS 576,055   3/1946   Great Britain.

LIONEL M. SHAPIRO, Primary Examiner

J. R. HOFFMAN, Assistant Examiner